US012322150B2

(12) United States Patent
Lee et al.

(10) Patent No.: US 12,322,150 B2
(45) Date of Patent: Jun. 3, 2025

(54) METHOD AND APPARATUS WITH OBJECT TRACKING

(71) Applicant: SAMSUNG ELECTRONICS CO., LTD., Suwon-si (KR)

(72) Inventors: Dongwook Lee, Suwon-si (KR); Seohyung Lee, Yongin-si (KR); Changbeom Park, Seoul (KR); Byung In Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 17/856,374

(22) Filed: Jul. 1, 2022

(65) Prior Publication Data

US 2023/0206586 A1 Jun. 29, 2023

(30) Foreign Application Priority Data

Dec. 27, 2021 (KR) .......................... 10-2021-0188436

(51) Int. Cl.
*G06K 9/00* (2022.01)
*G06T 7/73* (2017.01)
(Continued)

(52) U.S. Cl.
CPC .............. *G06V 10/273* (2022.01); *G06T 7/74* (2017.01); *G06V 10/25* (2022.01); *G06V 10/761* (2022.01); *G06T 2207/20084* (2013.01)

(58) Field of Classification Search
CPC .... G06V 10/273; G06V 10/25; G06V 10/761; G06V 10/22; G06V 10/766; G06V 10/82;
(Continued)

(56) References Cited

U.S. PATENT DOCUMENTS 10,269,125 B1 4/2019 Kim et al.
10,558,891 B2 * 2/2020 Wang .................... G06F 18/214
(Continued)

FOREIGN PATENT DOCUMENTS

KR 10-2017-0134158 A 12/2017
KR 10-1882743 B1 8/2018
(Continued)

OTHER PUBLICATIONS

Guo, Song, et al. "Online multiple object tracking with cross-task synergy." Proceedings of the IEEE/CVF conference on computer vision and pattern recognition. 2021.*

(Continued)

*Primary Examiner* — Atiba O Fitzpatrick
(74) *Attorney, Agent, or Firm* — NSIP Law

(57) ABSTRACT

A method and apparatus for object tracking are provided, where the object tracking method includes determining box information of candidate boxes in a current image frame and similarity scores of the candidate boxes based on including a search region of the current image frame with a template image corresponding to a target object, adjusting the similarity scores of the candidate boxes using a distractor map including distractor information of a previous image frame, determining a target box corresponding to the target object and a distractor box corresponding to a distractor of the target object from the candidate boxes based on the adjusted similarity scores, and updating the distractor map based on distractor information of the current image frame according to the distractor box.

25 Claims, 9 Drawing Sheets

(51) Int. Cl.
*G06V 10/25* (2022.01)
*G06V 10/26* (2022.01)
*G06V 10/74* (2022.01)

(58) Field of Classification Search
CPC .... G06V 10/62; G06V 2201/07; G06V 10/74; G06V 10/75; G06V 10/759; G06V 10/757; G06V 10/443; G06V 10/751; G06T 7/74; G06T 2207/20084; G06T 2207/10016; G06T 7/248; G06T 7/251; G06T 2207/30196; G06T 7/246; G06T 7/223; G06T 2210/12; G06T 7/20; G06T 7/231; G06T 7/238; G06T 7/70; G06T 7/73; G06T 2207/30241; G06N 3/02
See application file for complete search history.

(56) References Cited

U.S. PATENT DOCUMENTS

| | | | |
|---|---|---|---|
| 10,650,279 B1 | 5/2020 | Kim et al. | |
| 2014/0247963 A1* | 9/2014 | Lin | G06V 10/751 382/103 |
| 2015/0286872 A1* | 10/2015 | Medioni | G06T 7/20 382/103 |
| 2017/0061229 A1* | 3/2017 | Rastgar | G06T 7/248 |
| 2017/0344808 A1 | 11/2017 | El-Khamy et al. | |
| 2019/0130230 A1 | 5/2019 | Kang et al. | |
| 2020/0026954 A1* | 1/2020 | Rhodes | G06V 10/454 |
| 2021/0124928 A1* | 4/2021 | Wang | G06T 7/248 |
| 2022/0138493 A1 | 5/2022 | Lee et al. | |
| 2022/0301188 A1 | 9/2022 | Yoon et al. | |
| 2022/0309686 A1 | 9/2022 | Song et al. | |
| 2022/0383514 A1 | 12/2022 | Lee et al. | |

FOREIGN PATENT DOCUMENTS

| | | |
|---|---|---|
| KR | 10-2224101 B1 | 3/2021 |
| KR | 10-2021-0056050 | 5/2021 |
| KR | 10-2296507 B1 | 9/2021 |
| KR | 10-2348593 B1 | 1/2022 |
| KR | 10-2372687 B1 | 3/2022 |
| KR | 10-2022-0059194 A | 5/2022 |
| KR | 10-2022-0129905 A | 9/2022 |
| KR | 10-2022-0133567 A | 10/2022 |
| KR | 10-2022-0159638 A | 12/2022 |

OTHER PUBLICATIONS

Xiang, Jun, et al. "Multiple target tracking by learning feature representation and distance metric jointly." arXiv preprint arXiv:1802.03252 (2018).*

Cary S Feria, "The effects of distractors in multiple object tracking are modulated by the similarity of distractor and target features", Department of Psychology, One Washington Square, San Jose State University, San Jose, CA 95192-0120, USA; in revised form Mar. 5, 2012 (Year: 2012).*

Zheng Zhu, Qiang Wang, Bo Li, Wei Wu, Junjie Yan, and Weiming Hu, "Distractor-aware Siamese Networks for Visual Object Tracking", arXiv:1808.06048v1 [cs.CV] Aug. 18, 2018 (Year: 2018).*

Yang, Tianyu, et al. "Visual Tracking via Dynamic Memory Networks." IEEE transactions on pattern analysis and machine intelligence 43.1, arXiv:1907.07613v3 [cs.CV] Nov. 29, 2019, (14 pages in English).

Xu, Shifang, et al. "Enhancing Siamese Network by Color Histogram Based Bayes Classifier for Distractor-aware Object Tracking." 2019 International Conference on Intelligent Informatics and Biomedical Sciences (ICIIBMS). IEEE, 2019, (4 pages in English).

Bhat, Goutam, et al. "Know Your Surroundings: Exploiting Scene Information for Object Tracking." Computer Vision-ECCV 2020: 16th European Conference, Proceedings, Part XXIII 16. Springer International Publishing, arXiv:2003.11014v2 [cs.CV] May 1, 2020, (21 pages in English).

Guo, Song, et al. "Online Multiple Object Tracking with Cross-Task Synergy." Proceedings of the IEEE/CVF Conference on Computer Vision and Pattern Recognition. 2021, (10 pages in English).

Extended European search report issued on May 23, 2023, in counterpart European Patent Application No. 22189325.8 (12 pages in English).

* cited by examiner

METHOD AND APPARATUS WITH OBJECT TRACKING

CROSS-REFERENCE TO RELATED APPLICATIONS

This application claims the benefit under 35 USC § 119 (a) of Korean Patent Application No. 10-2021-0188436, filed on Dec. 27, 2021, in the Korean Intellectual Property Office, the entire disclosure of which is incorporated herein by reference for all purposes.

BACKGROUND

1. Field

The following description relates to a method and apparatus for object tracking.

2. Description of Related Art

Object recognition has been automated using, for example, a neural network model, which may provide a computationally intuitive mapping between an input pattern and an output pattern after considerable training. An ability to be trained to generate such mapping may be referred to as a learning ability of the neural network. Moreover, due to specialized training, such a specialized and trained neural network may have a generalization ability to generate a relatively accurate output for an input pattern that has not been trained.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, there is provided a processor-implemented object tracking method, including determining box information of candidate boxes in a current image frame and similarity scores of the candidate boxes based on including a search region of the current image frame with a template image corresponding to a target object, adjusting the similarity scores of the candidate boxes using a distractor map including distractor information of a previous image frame, determining a target box corresponding to the target object and a distractor box corresponding to a distractor of the target object from the candidate boxes based on the adjusted similarity scores, and updating the distractor map based on distractor information of the current image frame according to the distractor box.

The adjusting of the similarity scores may include determining a mask according to the distractor information of the previous image frame, and adjusting the similarity scores based on an overlap between the candidate boxes and the mask.

The adjusting of the similarity scores based on the overlap may include reducing a similarity score of a candidate box from among the candidate boxes overlapping with the mask at a ratio greater than or equal to a threshold ratio.

The adjusting of the similarity scores based on the overlap state may include reducing the similarity scores of each of the candidate boxes in proportion to an overlap ratio of the respective candidate boxes with the mask.

The updating of the distractor map may include applying motion of the distractor to the distractor map.

The applying of the motion of the distractor to the distractor map may include inputting the distractor information of the previous image frame and the distractor information of the current image frame to a neural network-based motion estimation model, and estimating the motion of the distractor from an output of the motion estimation model.

The object tracking method further may include determining a tracking state of the current image frame based on the box information and the similarity scores, and setting an object tracking mode to any one of a precise tracking mode for performing object tracking with the distractor map or a normal tracking mode for performing object tracking without the distractor map based on the tracking state.

The object tracking may be performed based on the adjusting of the similarity scores, the determining of the target box and the distractor box, and the updating of the distractor map, in response to the object tracking mode being set to the precise tracking mode, and the target box may be determined based on the box information of the candidate boxes and the similarity scores of the candidate boxes without performing the adjusting of the similarity scores, the determining of the target box and the distractor box, and the updating of the distractor map, in response to the object tracking mode being set to the normal tracking mode.

The setting of the object tracking mode may include setting the object tracking mode to the normal tracking mode, in response to any one or any combination of non-existence of the distractor of the target object, occlusion of the target object, and detachment of the target object from a frame.

The determining of the box information of the candidate boxes and the similarity scores of the candidate boxes may include inputting the search region and the template image to a neural network-based image comparison model, and determining the box information of the candidate boxes and the similarity scores of the candidate boxes from an output of the image comparison model.

In another general aspect, there is provided an object tracking apparatus, including a memory configured to store instructions executable by the processor, and a processor configured to execute the instructions to configure the processor to determine box information of candidate boxes in a current image frame and similarity scores of the candidate boxes based on including a search region of the current image frame with a template image corresponding to a target object, adjust the similarity scores of the candidate boxes using a distractor map including distractor information of a previous image frame, determine a target box corresponding to the target object and a distractor box corresponding to a distractor of the target object from the candidate boxes based on the adjusted similarity scores, and update the distractor map based on distractor information of the current image frame according to the distractor box.

The processor may be configured to determine a mask according to the distractor information of the previous image frame, and adjust the similarity scores based on an overlap between the candidate boxes and the mask.

The processor may be configured to update the distractor map by applying motion of the distractor to the distractor map.

The processor may be configured to determine a tracking state of the current image frame based on the box information and the similarity scores, and set an object tracking mode to any one of a precise tracking mode for performing object tracking with the distractor map or a normal tracking mode for performing object tracking without the distractor map based on the tracking state.

The processor may be configured to input the search region and the template image to an image comparison model based on a neural network, and determine the box information of the candidate boxes and the similarity scores of the candidate boxes from an output of the image comparison model.

In another general aspect, there is provided an electronic apparatus, including a camera configured to generate an input image including image frames, and a processor configured to execute the instructions to configure the processor to determine box information of candidate boxes in a current image frame and similarity scores of the candidate boxes based on including a search region of the current image frame among the image frames with a template image corresponding to a target object, adjust the similarity scores of the candidate boxes using a distractor map including distractor information of a previous image frame among the image frames, determine a target box corresponding to the target object and a distractor box corresponding to a distractor of the target object from the candidate boxes based on the adjusted similarity scores, and update the distractor map based on distractor information of the current image frame according to the distractor box.

The processor may be configured to determine a mask according to the distractor information of the previous image frame, and adjust the similarity scores based on an overlap state between the candidate boxes and the mask.

The processor may be configured to update the distractor map by applying motion of the distractor to the distractor map.

The processor may be configured to determine a tracking state of the current image frame based on the box information and the similarity scores, and set an object tracking mode to any one of a precise tracking mode for performing object tracking with the distractor map or a normal tracking mode for performing object tracking without the distractor map based on the tracking state.

The template image may include an image frame from among the image frames, and the search region may include another image frame from among the image frames succeeding the image frame.

A processor-implemented object tracking method, including determining a template image corresponding to a target object from image frames received from a sensor; determining a search region from an image frame of the image frames subsequent to an image frame of the template image; extracting a template feature map from the template image and a search feature map from the search region; determining box information of candidate boxes and similarity scores of the candidate boxes based on a comparison of the template feature map and the search feature map using a neural network-based image comparison model; adjusting the similarity scores of the candidate boxes using a distractor map including distractor information of an image frame prior to the image frame of the search region; and generating a target box corresponding to the target object and a distractor box corresponding to a distractor of the target object from the candidate boxes based on the adjusted similarity scores.

The object tracking method may include outputting tracking result of the target object based on box information corresponding to the target box.

The object tracking method may include updating the distractor map based on box information corresponding to the distractor box.

A size of the search region may be greater than a size of the template image.

Other features and aspects will be apparent from the following detailed description, the drawings, and the claims.

Figure 1:
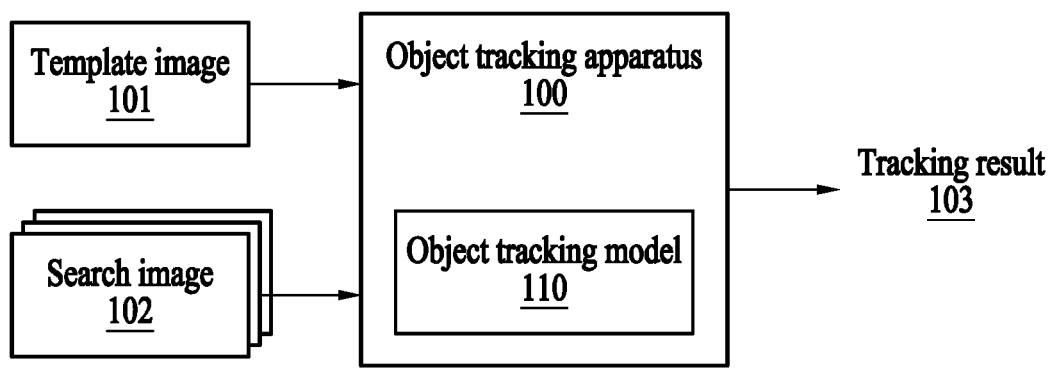
FIG. 1 illustrates an example of a configuration and operation of an object tracking apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of a configuration and operation of an object tracking apparatus. Referring to FIG. 1, an object tracking apparatus 100 may output a tracking result 103 based on a template image 101 and a search image 102. The template image 101 may provide information of a target object to be tracked. The object tracking apparatus 100 may track the target object in the search image 102 using the information of the target object (or hereinafter the target object information) of the template image 101. The tracking result 103 may represent a position of the target object in the target image 102. In an example, the tracking result 103 may be used for automated tracking, zooming, and focusing.

In an example, the template image 101 and the search image 102 may correspond to a plurality of image frames of an input image. For example, the template image 101 may correspond to an image frame of an input video file including a plurality of image frames, and the search image 102 may correspond to at least one image frame after the image frame corresponding to the template image 101. For another example, the template image 101 and the search image 102 may correspond to files independent of each other. In this example, the search image 102 may correspond to an input video file including a plurality of image frames, and the template image 101 may correspond to a still input image file that is not related to the input video file. In either case, the template image 101 may include the target object, and the object tracking apparatus 100 may generate the tracking result 103 by tracking the target object in the search image 102. The template image 101 and the search image 102 may correspond to either an entire region of a corresponding image frame or a portion of the corresponding image frame. For example, the object tracking apparatus 100 may set a search region in the search image 102 and track the target object in the search region.

The object tracking apparatus 100 may generate the tracking result 103 using an object tracking model 110. The object tracking model 110 may include an artificial intelligence model based on machine learning. For example, the object tracking model 110 may include a deep neural network (DNN) including a plurality of layers. The plurality of layers may include an input layer, at least one hidden layer, and an output layer. In the neural network layer, an input image or map may be convoluted with a filter called a kernel, and as a result, a plurality of feature maps may be output. The output feature maps may be again convoluted in a subsequent convolutional layer as input feature maps with another kernel, and a plurality of new feature maps may be output. After the convolution operations are repeatedly performed, and potentially, other layer operations performed, the recognition or classification results of features of the input image through the neural network may be finally output, as non-limiting examples.

The neural network or DNN may generate mapping between input information and output information, and may have a generalization capability to infer a relatively correct output with respect to input information that has not been used for training. The neural network may refer to a general model that has an ability to solve a problem or perform tasks, as non-limiting examples, where nodes form the network through connections and other parameter adjustment through training The DNN may include at least one of a fully connected network (FCN), a convolutional neural network (CNN), and a recurrent neural network (RNN), a restricted Boltzmann machine (RBM), a deep belief network (DBN), a bidirectional recurrent DNN (BRDNN), a deep Q-network, or a combination of two or more thereof, but examples thereof are not limited to the foregoing examples. For example, at least a portion of the layers in the neural network may correspond to the CNN, and another portion of the layers may correspond to the FCN. In this case, the CNN may be referred to as a convolutional layer, and the FCN may be referred to as a fully connected layer.

In the case of the CNN, data input to each layer may be referred to as an input feature map, and data output from each layer may be referred to as an output feature map. The input feature map and the output feature map may also be referred to as activation data. When the convolutional layer corresponds to an input layer, an input feature map of the input layer may be an input image. The output feature map may be generated through a convolution operation between the input feature map and a weight kernel. Each of the input feature map, the output feature map, and the weight kernel may be distinguished by a unit of a tensor.

In an example, training an artificial neural network may indicate determining and adjusting weights and biases between layers or weights and biases among a plurality of nodes belonging to different layers adjacent to one another, as only non-limiting examples of such parameters.

After trained based on deep learning, the neural network may perform inference that is suitable for a training purpose by mapping input data and output data that are in a nonlinear relationship to each other. The deep learning is a machine learning technique for solving a problem such as image or speech recognition from a big data set. The deep learning may be construed as an optimized problem solving process of finding a point at which energy is minimized while training the neural network using prepared training data.

Through supervised or unsupervised learning of the deep learning, a structure of the neural network or a weight corresponding to the model may be obtained, and the input data and the output data may be mapped to each other through the weight. When a width and a depth of the neural network are sufficiently large, the neural network may have a capacity sufficient to implement an arbitrary function. The neural network may achieve an optimized performance when learning a sufficiently large amount of training data through an appropriate training process.

The neural network will be expressed as being trained in advance or pre-trained. The expression "trained in advance" or "pre-trained" may indicate a time before the neural network "starts." That the neural network "starts" means that the neural network is ready for inference. For example, that the neural network that "starts" may include that the neural network is loaded into a memory, or that input data for the inference is input to the neural network after the neural network is loaded into the memory.

The neural network may include a hardware structure that may be implemented through execution of instructions by a processor.

The object tracking apparatus 100 may input the template image 101 and the search image 102 to the object tracking model 110 and obtain the tracking result 103 from output of the object tracking model 110. The object tracking model 110 may be trained in advance to output the tracking result 103 based on the input of the template image 101 and the search image 102.

Figure 2:
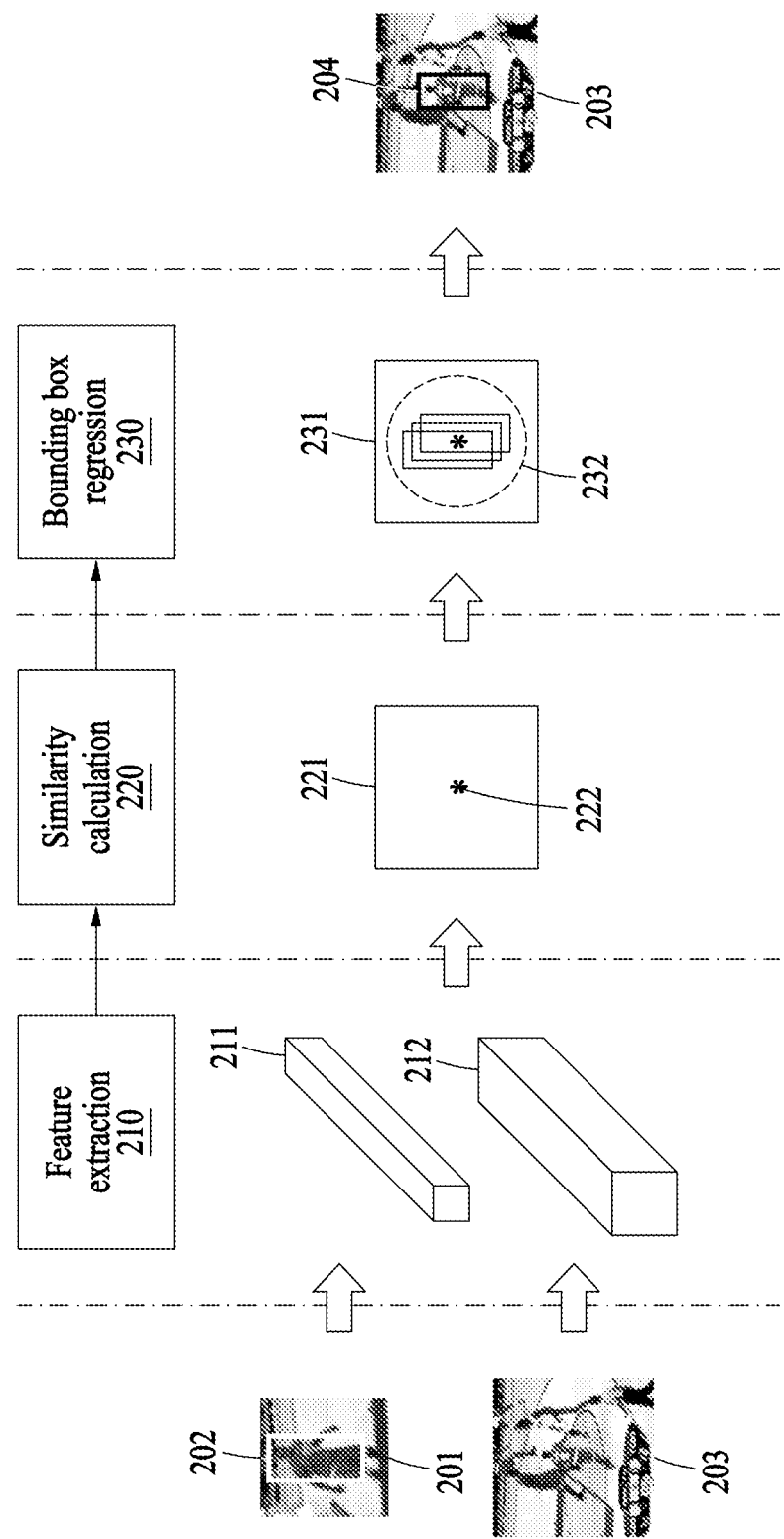
FIG. 2 illustrates an example of deriving a similarity score.

FIG. 2 illustrates an example of deriving a similarity score. Referring to FIG. 2, an object tracking apparatus may perform object tracking through feature extraction 210, similarity calculation 220, and bounding box regression 230. At least one of the feature extraction 210, the similarity calculation 220, and the bounding box regression 230 may be performed through an object tracking model. For example, the object tracking model may include at least one of a feature extraction network for the feature extraction 210, a similarity calculation network for the similarity calculation 220, and a bounding box regression network for the bounding box regression 230. Each of the feature extraction network, the similarity calculation network, and the bounding box regression network may correspond to a neural network. The object tracking model may include a Siamese network, for example.

The object tracking apparatus may extract a template feature map 211 from a template image 201 and extract a search feature map 212 from a search region 203. The object tracking apparatus may extract the template feature map 211 and the search feature map 212 using the object tracking model and/or a feature extraction model sharing parameters. In the example of FIG. 2, the template image 201 corresponds to a partial region of an initial image frame (which may be referred to as a first image frame) of an input image, and the search region 203 corresponds to a partial region of an nth image frame of the input image. Here, n may be a value greater than 1.

When a target object is determined in the first image frame, a target box 202 corresponding to the target object may be determined. For example, the target object may be determined according to a user input for selecting the target object. The target box 202 is a type of a bounding box and may be specified based on box position information (e.g., x-coordinate and y-coordinate) and box size information (e.g., a width and a height). The box position information and the box size information may be collectively referred to as box information. The template image 201 may be determined based on a position and a size of the target box 202. The search region 203 may be determined based on the template image 201. A size of the search region 203 may be determined based on a size of the template image 201. For example, the size of the search region 203 may be determined to be greater than the size of the template image 201. A position of the search region 203 may be determined based on a position of a target box in a previous image frame. For example, when a target box is detected from an n−1th image frame, a search region of an nth image frame may be determined based on a position of the target box.

The object tracking apparatus may calculate similarity by comparing the template feature map 211 and the search feature map 212. The similarity calculation 220 may be performed through the similarity calculation network. The similarity calculation network may derive a cross correlation between the template feature map 211 and the search feature map 212 through a cross correlation layer. A calculation result may represent information of the target object and/or a position in the search region 203 corresponding to the template feature map 211. For example, the calculation result may display a corresponding position 222 in a search space 221 corresponding to the search region 203 and/or a score of the position 222.

The object tracking apparatus may perform regression using bounding boxes 232 of the position 222 in the search space 231 corresponding to the search region 203. The object tracking apparatus may determine a target box 204 corresponding to the target object in the search region 203 through the regression and generate a tracking result based on box information of the target box 204.

In an example, a similarity score is based on objectness of the target object. Thus, when a distractor of the target object is in the search region 203, accuracy of object tracking may be affected. The distractor may be an object that is not the target object but may be highly similar to the target object. For example, in an image where track and field athletes run on a track, other athletes around an athlete who is the target object may be distractors. When a scene has many distractors, there may be numerous activation peaks corresponding to high similarity scores.

For example, the distractors may be distinguished from the target object by giving a low weight to a similarity score of an object far from a center of the target object. This technique, however, may not be effective in object tracking, for example, when the target object is occluded, when the similarity score decreases due to deformation of the target object, when an object highly similar to the target object approaches the target object, and the like. For another example, to increase distinction between a distractor and a target, a technique of configuring a backbone and a loss function and a technique using multiple object tracking (MOT) may be employed. However, these techniques may need large-scale operations.

Figure 3:
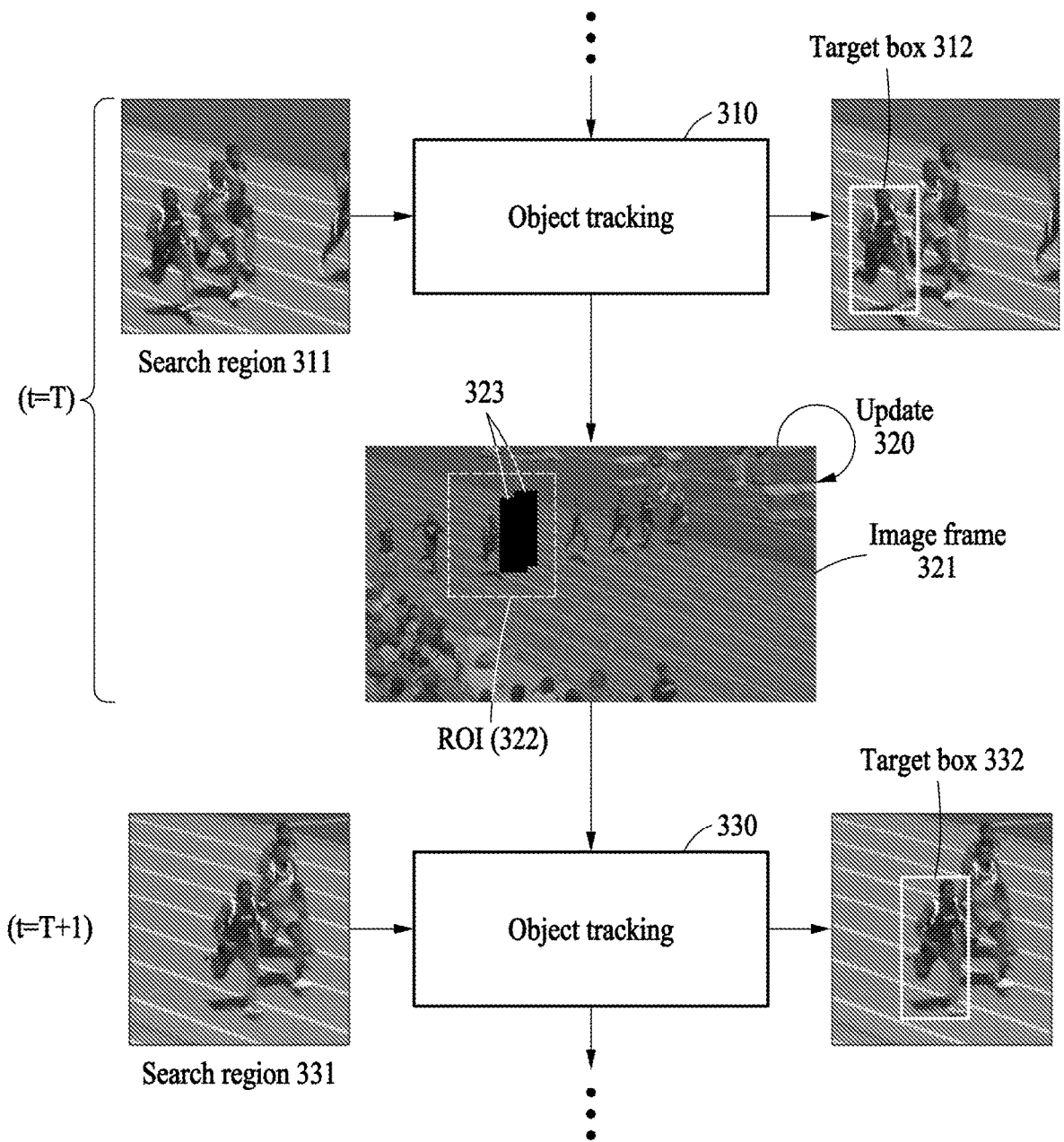
FIG. 3 illustrates an example of an object tracking operation using a distractor map.

FIG. 3 illustrates an example of an object tracking operation using a distractor map. In an example, an object tracking apparatus may distinguish between a target object and a distractor map including distractor information. The distractor map may represent the distractor information in a low-capacity representation and may be applicable to object tracking through a simple operation. For example, the distractor map may include representation bits of the same size as a size of an image frame, and each representation bit may indicate the presence or absence of the distractor in its position. An adjustment operation using the distractor map may be added to a typical object tracking operation in a manner of an add-on, adding only a substantially small amount of computation. Because such an adjustment operation uses candidate boxes, an additional operation cost may be substantially smaller than other techniques that need an additional neural network model such as an MOT for handling the distractor. Also, to reduce a computation amount, most deep learning-based object trackers mainly use a partial region, not an entire frame, for object tracking. However, the distractor map may provide information on the entire frame and may thereby compensate for a limitation that may be caused by using the partial region.

Referring to FIG. 3, the object tracking apparatus may perform an object tracking operation 310 based on a search region 311 of a Tth image frame 321 at time T (t=T) and determine a target box 312 of the search region 311. The object tracking apparatus may perform the object tracking operation 310 using distractor information of a T−1th image frame at time T−1 (t=T−1) and perform an update operation 320 on a distractor map based on distractor information of the Tth image frame 321. The distractor map may have the same size as a size of the Tth image frame 321 and include distractor information of at least a partial region in the Tth image frame 321. The distractor map including distractor information of a region of interest (ROI) 322 will be described below, but the distractor map may include distractor information of a region other than the ROI 322. The distractor information may include a mask 323 corresponding to a distractor box.

The object tracking apparatus may perform an object tracking operation 330 based on a search region 331 of a T+1th image frame at time T+1 (t=T+1) and determine a target box 332 of the search region 331. The object tracking apparatus may perform the object tracking operation 330 using the distractor information of the Tth image frame 321. The ROI 322 may have the same size as a size of the search region 331. The object tracking apparatus may distinguish between a target object and a distractor by applying the mask 323 of the ROI 322 to the search region 331 and determine the target box 332 of the search region 331.

Figure 4:
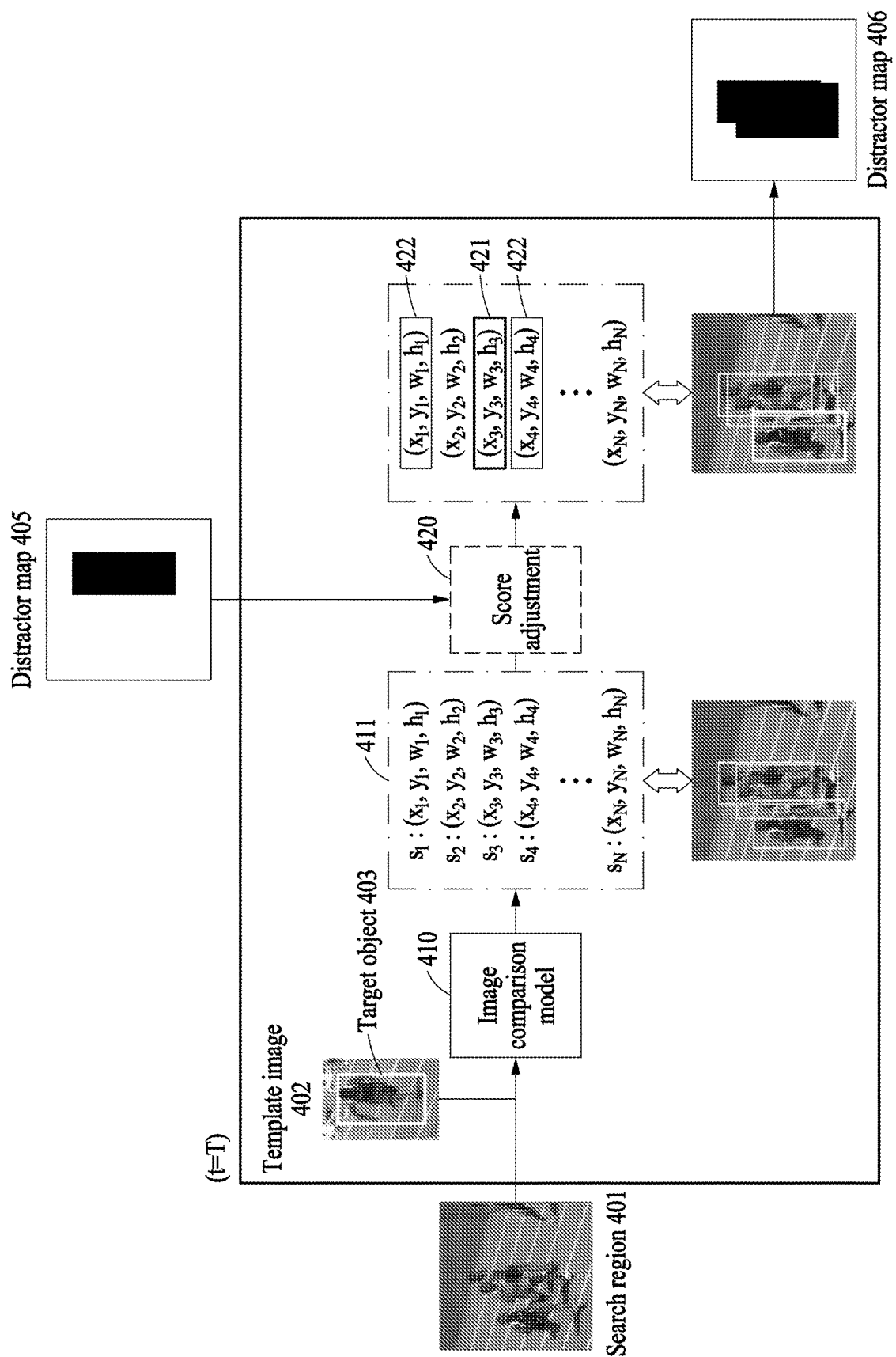
FIG. 4 illustrates an example of an operation of object tracking using a distractor map.

FIG. 4 illustrates an example of an operation of object tracking using a distractor map. Referring to FIG. 4, an object tracking apparatus may determine box information $x_n$, $y_n$, $w_n$, and $h_n$ of candidate boxes in a Tth image frame and similarity scores $s_n$ of the candidate boxes by comparing a search region 401 of the Tth image frame with a template image 402 corresponding to a target object 403. Here, n may be a box identifier and have a value of 1 through N. N may be a total number of the candidate boxes. The object tracking apparatus may input the search region 401 and the template image 402 to an image comparison model 410 based on a neural network and determine the box information $x_n$, $y_n$, $w_n$, and $h_n$ and the similarity scores $s_n$ from an output 411 of the image comparison model 410.

The object tracking apparatus may adjust the similarity scores $s_n$ by performing a score adjustment operation 420 using a distractor map 405 including distractor information of a T−1th image frame. When the Tth image frame corresponds to a first image frame, the object tracking apparatus may uniformly adjust the similarity scores $s_n$ of all the candidate boxes under the assumption that all the candidate boxes of the output 411 are distractors. The object tracking apparatus may determine the target box 421 corresponding to a target object and a distractor box 422 corresponding to a distractor of the target object from the candidate boxes based on the adjusted similarity scores. The object tracking apparatus may update the distractor map 405 to a distractor map 406 based on distractor information of the Tth image frame according to the distractor box 422.

Figure 5:
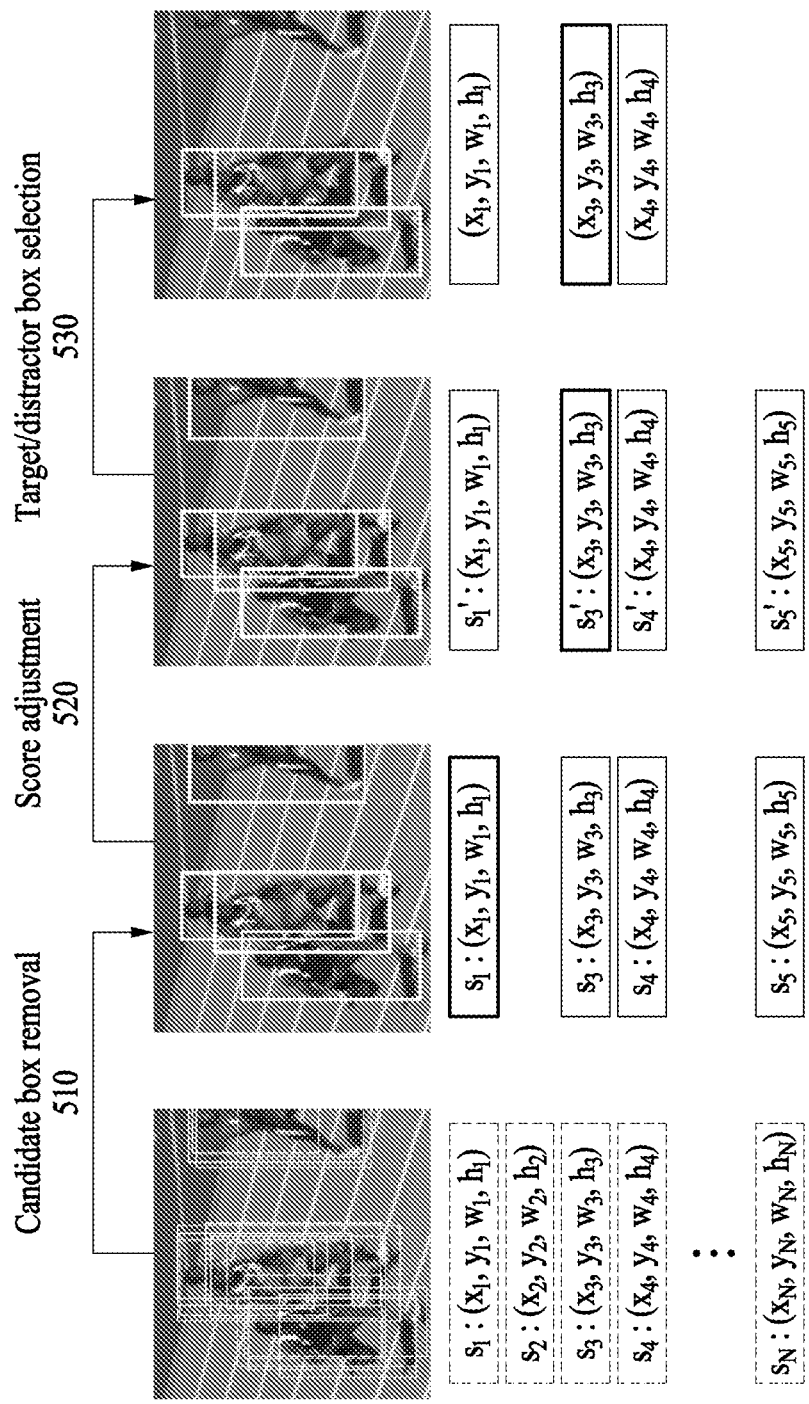
FIG. 5 illustrates an example of selecting a target box and a distractor box from among candidate boxes.

FIG. 5 illustrates an example of selecting a target box and a distractor box from among candidate boxes. Referring to FIG. 5, an object tracking apparatus may remove duplicate or overlapping candidate boxes through a candidate box removal operation 510. For example, the object tracking apparatus may perform a non-maximum suppression (NMS).

The object tracking apparatus may adjust similarity scores $s_n$ through a score adjustment operation 520. The object tracking apparatus may determine a mask according to distractor information of a previous image frame and adjust the similarity scores $s_n$ based on an overlap state between candidate boxes and the mask. When there is a candidate box overlapping with the mask, the candidate box may correspond to a distractor, and the object tracking apparatus may thus reduce a similarity score of the candidate box in such a way that the candidate box is not selected as a target box. The mask may display an inner region of a distractor box of the previous image frame. When there is a plurality of distractor boxes in the previous image frame, the mask may be set corresponding to all the distractor boxes.

In an example, the object tracking apparatus may reduce a similarity score of a candidate box overlapping with the mask at a ratio greater than or equal to a threshold ratio (50% or more, for example) among the candidate boxes. The object tracking apparatus may reduce the similarity scores of the candidate boxes in proportion to an overlap ratio of each of the candidate boxes with the mask. For example, the object tracking apparatus may reduce by 50% a similarity score of a first candidate box overlapping the mask 50% and reduce by 60% a similarity score of a second candidate box overlapping the mask 60%.

The object tracking apparatus may select the target box and the distractor box from among the candidate boxes through a box selection operation 530. The object tracking apparatus may select K candidate boxes with a high reliability score from among the candidate boxes, determine one with the highest reliability score among the K candidate boxes as the target box, and determine the rest of the K candidate boxes as distractor boxes. In the example of FIG. 5, K may be 3. A similarity score $s_1$ of a distractor may have the highest value before the score adjustment operation 520. Through the score adjustment operation 520, however, the similarity score $s_1$ may be reduced to a similarity score $s_1'$ and a similarity score $s_3'$ of the target object may have the highest value.

Figure 6:
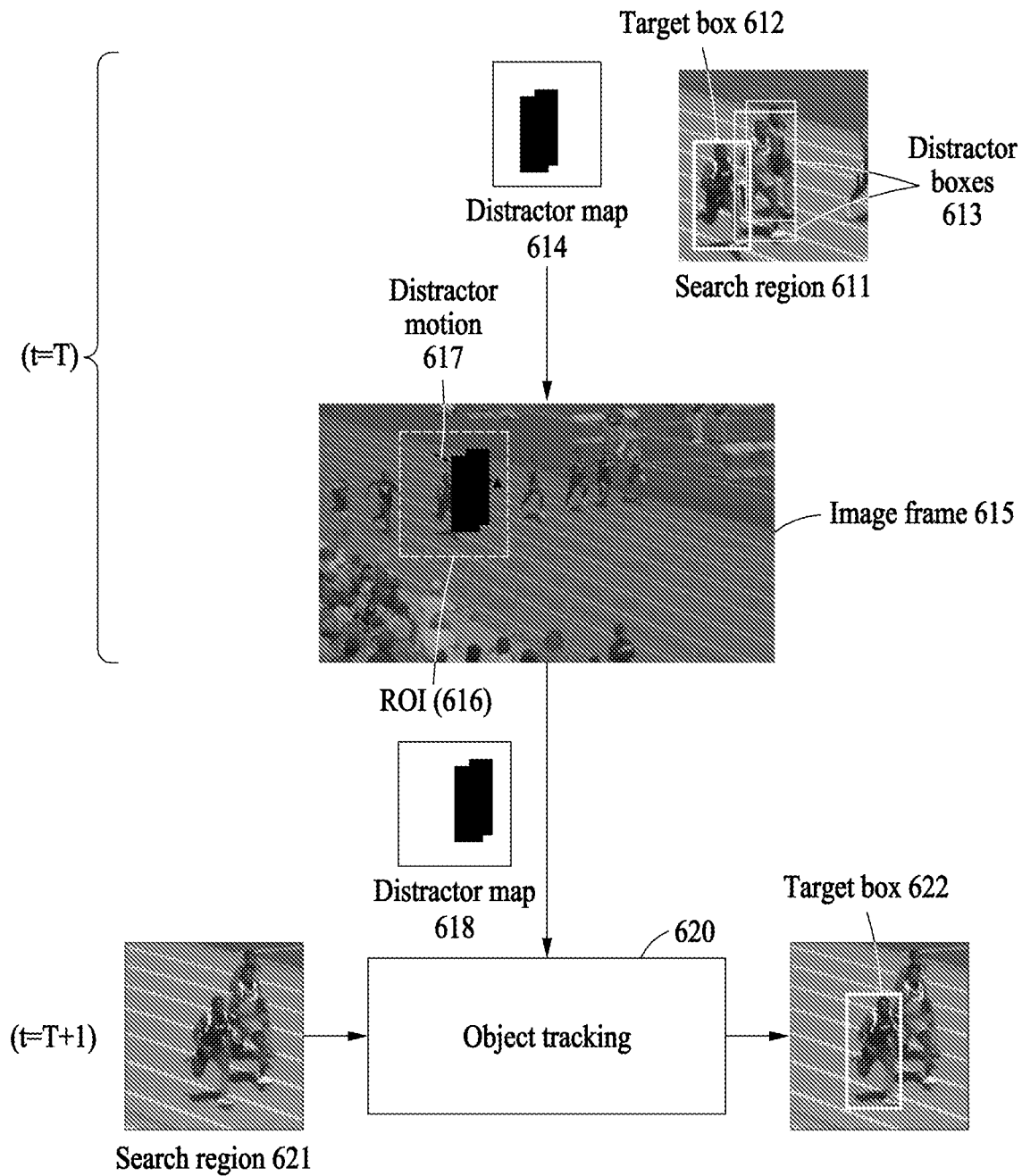
FIG. 6 illustrates an example of updating a distractor map by applying distractor motion.

FIG. 6 illustrates an example of updating a distractor map by applying distractor motion. Referring to FIG. 6, an object tracking apparatus may determine a target box 612 and distractor boxes 613 in a search region 611 of a Tth image frame 615 and determine a distractor map 614 based on distractor information according to the distractor boxes 613. The distractor map 614 may include a mask corresponding to the distractor boxes 613.

The object tracking apparatus may determine a distractor map 618 by applying distractor motion 617 to the distractor map 614 and determine a target box 622 of a search region 621 by performing an object tracking operation 620 on the search region 621 of a T+1th image frame using the distractor map 618. The object tracking apparatus may adjust the mask and/or an ROI 616 based on the distractor motion 617. The object tracking apparatus may move the mask in the distractor map 614 in the same direction as the distractor motion 617. In another example, the object tracking apparatus may move the ROI 616 in the opposite direction to the distractor motion 617.

The distractor maps 614 and 618 are illustrated in FIG. 6 as corresponding to a partial region of the image frame 615. However, the distractor maps 614 and 618 may correspond to an entire region of the image frame 615 and a partial region corresponding to the ROI 616 in the entire region may be extracted to be used for a score adjustment operation. Thus, when the object tracking apparatus moves the mask in the distractor map 614 in the same direction as the distractor motion 617 or moves the ROI 616 in the opposite direction to the direction of the distractor motion 617, the mask in the distractor map 614 may be adjusted as with the mask in the distractor map 618.

The object tracking apparatus may estimate the distractor motion 617 based on difference between distractor information of a previous image frame and distractor information of a current image frame. In an example, the object tracking apparatus may estimate the distractor motion 617 using a neural network-based motion estimation model. The object tracking apparatus may input at least one of the distractor information of the previous image frame and the distractor information of the current image frame to the motion estimation model and estimate motion of a distractor from output of the motion estimation model. The motion estimation model may be trained in advance to estimate the motion of the distractor from distractor information of a plurality of consecutive image frames.

Figure 7:
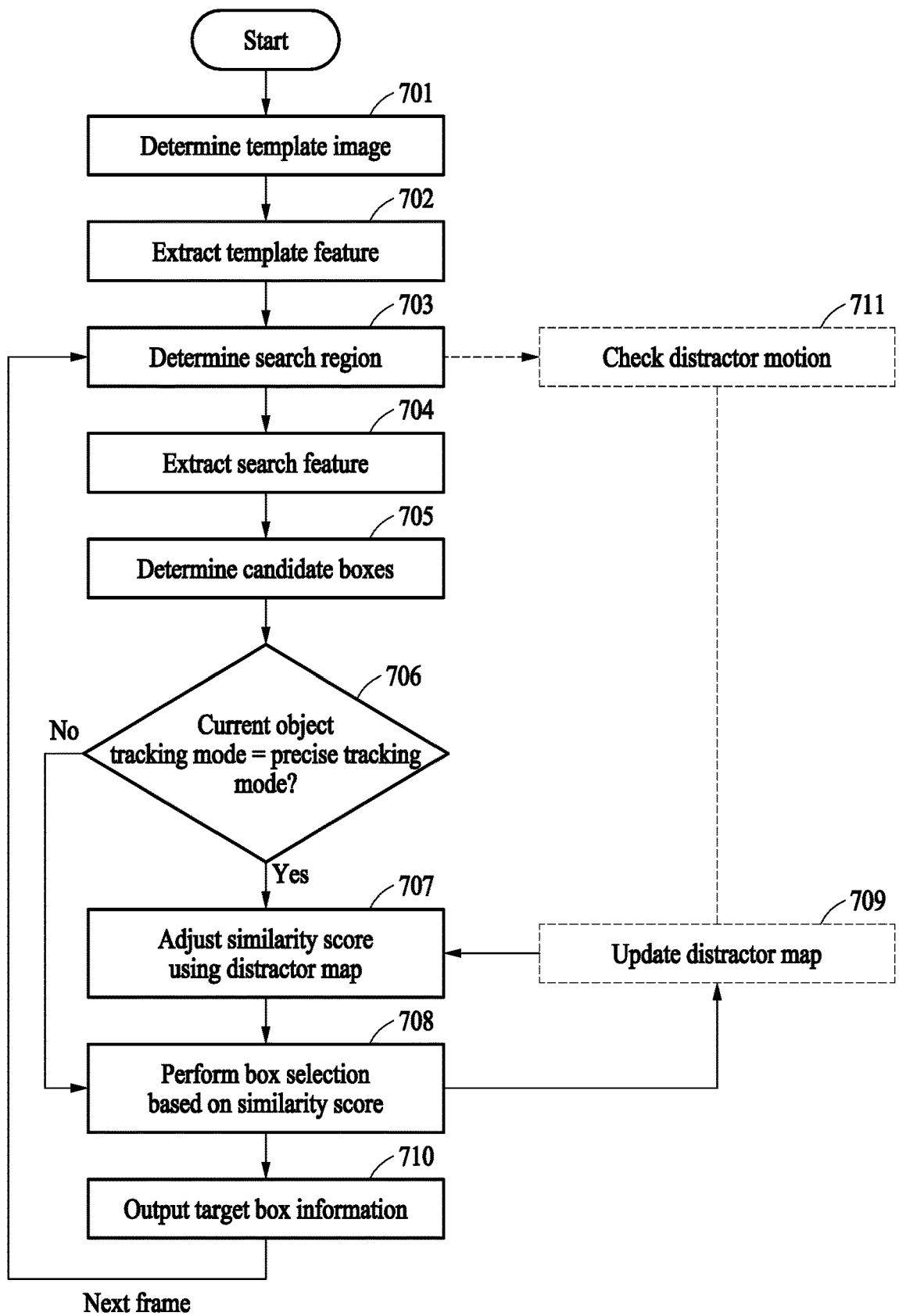
FIG. 7 illustrates an example of object tracking motion in a current object tracking mode.

FIG. 7 illustrates an example of object tracking motion in a current object tracking mode. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. For example, operations of the method may be performed by a computing apparatus (e.g., the object tracking apparatus 800 in FIG. 8). In addition to the description of FIG. 7 below, the descriptions of FIGS. 1-6 are also applicable to FIG. 7, and are incorporated herein by reference. Thus, the above description may not be repeated here.

Referring to FIG. 7, in operation 701, an object tracking apparatus may determine a template image. For example, the object tracking apparatus may determine the template image based on a user input selecting a target object in a first image frame of an input image. In operation 702, the object tracking apparatus may extract a template feature from the template image. In operation 703, the object tracking apparatus may determine a search region. For example, the object tracking apparatus may determine the search region in an nth image frame of the input image. Here, n may be a value greater than 1. The search region of the nth image frame may be determined based on box information of a target box of an n−1th image frame. In operation 704, the object tracking apparatus may extract a search feature from a search image. In operation 705, the object tracking apparatus may determine candidate boxes. The determining of the candidate boxes may include the determining of box information of the candidate boxes and similarity scores of the candidate boxes. The object tracking apparatus may determine the box information and the similarity scores by comparing the template feature and the search feature.

In operation 706, the object tracking apparatus may determine whether a current object tracking mode is a precise tracking mode. An object tracking mode may include the precise tracking mode for performing object tracking with a distractor map and a normal tracking mode for performing the object tracking without the distractor map. The object tracking apparatus may determine a tracking state of a current image frame based on the box information and the similarity scores and set the object tracking mode to any one of the precise tracking mode and the normal tracking mode based on the tracking state. In the precise tracking mode, the object tracking may be performed based on adjusting of the similarity scores, determining of the target box and a distractor box, and updating of the distractor map. In the normal tracking mode, the target box may be determined based on the box information of the candidate boxes and the similarity scores of the candidate boxes without such adjusting of the similarity scores, determining of the target box and the distractor box, and updating of the distractor map.

For example, the object tracking apparatus may set the object tracking mode to the normal tracking mode in at least any one case of non-existence of the distractor of the target object, occlusion of the target object, and detachment of the target object from a frame. For example, when the search region has only one candidate box, the search region may only have the target object without the distractor. In this case, using the distractor map may only decrease operational efficiency rather than increasing tracking performance, and the object tracking apparatus may thus perform the object tracking in the normal tracking mode without the distractor map. The normal tracking mode may also be used when a degree of the occlusion of the target object is high, the target object is detached from the frame, or there is high probability of such cases.

In operation 707, when the current object tracking mode is the precise tracking mode, the object tracking apparatus may adjust the similarity scores using the distractor map. In operation 708, the object tracking apparatus may perform box selection based on the similarity scores. When the current object tracking mode is the precise tracking mode, the box selection may be performed based on the similarity scores adjusted in operation 707, and the target box and the distractor box may be determined through the box selection. When the current object tracking mode is the normal tracking mode, the box selection may be performed without the score adjustment in operation 707, and only the target box may be determined through the box selection.

In operation 709, the object tracking apparatus may update the distractor map. Operation 709 may be performed in the precise tracking mode. When the distractor box is determined in the precise tracking mode, the distractor map may be updated based on the distractor information of the distractor box. In operation 711, when the motion of the distractor is applied, the object tracking apparatus may identify the motion of the distractor. In operation 709, the object tracking apparatus may update the distractor map by applying the motion of the distractor to the distractor map.

In operation 710, the object tracking apparatus may output target box information. The target box information may correspond to a tracking result. The target box information may include position information and size information of the target box. The object tracking apparatus may repeatedly perform operations 703 through 711 based on next frames.

Figure 8:
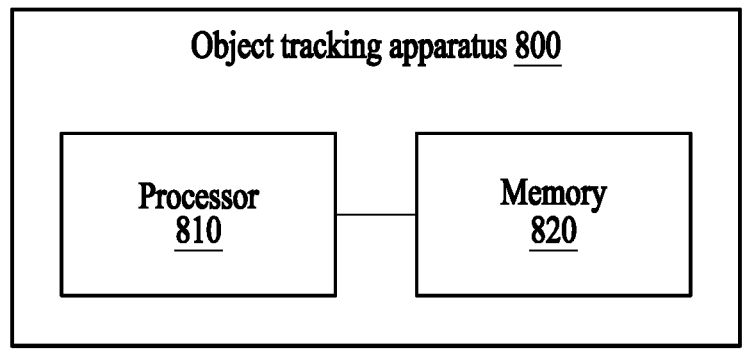
FIG. 8 illustrates an example of a configuration of an object tracking apparatus.

FIG. 8 illustrates an example of a configuration of an object tracking apparatus. Referring to FIG. 8, an object tracking apparatus 800 may include a processor 810 and a memory 820. The memory 820 may be connected to the processor 810 and store instructions executable by the processor 810, data to be computed by the processor 810, or data processed by the processor 810.

The memory 820 may include a volatile memory and/or a non-volatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 820 is provided below.

The processor 810 may execute instructions for performing the operations described with reference to FIGS. 1 through 7, 9, and 10. For example, the processor 810 may determine box information of candidate boxes in a current image frame and similarity scores of the candidate boxes by comparing a search region of the current image frame with a template image corresponding to a target object, adjust the similarity scores of the candidate boxes using a distractor map including distractor information of a previous image frame, determine a target box corresponding to the target object and a distractor box corresponding to a distractor of the target object from the candidate boxes based on the adjusted similarity scores, and update the distractor map based on distractor information of the current image frame according to the distractor box.

The processor 810 may read/write neural network data, for example, image data, feature map data, kernel data, biases, weights, for example, connection weight data, hyperparameters, and other parameters etc., from/to the memory 820 and implement the neural network-based image comparison model and the neural network-based motion estimation model using the read/written data. When the neural network is implemented, the processor 210 may repeatedly perform operations between an input and parameters, in order to generate data with respect to an output. Here, in an example convolution layer, a number of convolution operations may be determined, depending on various factors, such as, for example, the number of channels of the input or input feature map, the number of channels of the kernel, a size of the input feature map, a size of the kernel, number of the kernels, and precision of values. Such a neural network may be implemented as a complicated architecture, where the processor 810 performs convolution operations with an operation count of up to hundreds of millions to tens of billions, and the frequency at which the processor 810 accesses the memory 820 for the convolution operations rapidly increases.

The processor 810 may be a processing device implemented by hardware including a circuit having a physical structure to perform operations. For example, the operations may be implemented by execution of computer-readable instructions that configure the processing device to perform any one, or any combination, of the operations described.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA). Further details regarding the processor 810 is provided below.

In addition, the description provided with reference to FIGS. 1 through 7, 9, and 10 may apply to the object tracking apparatus 800.

Figure 9:
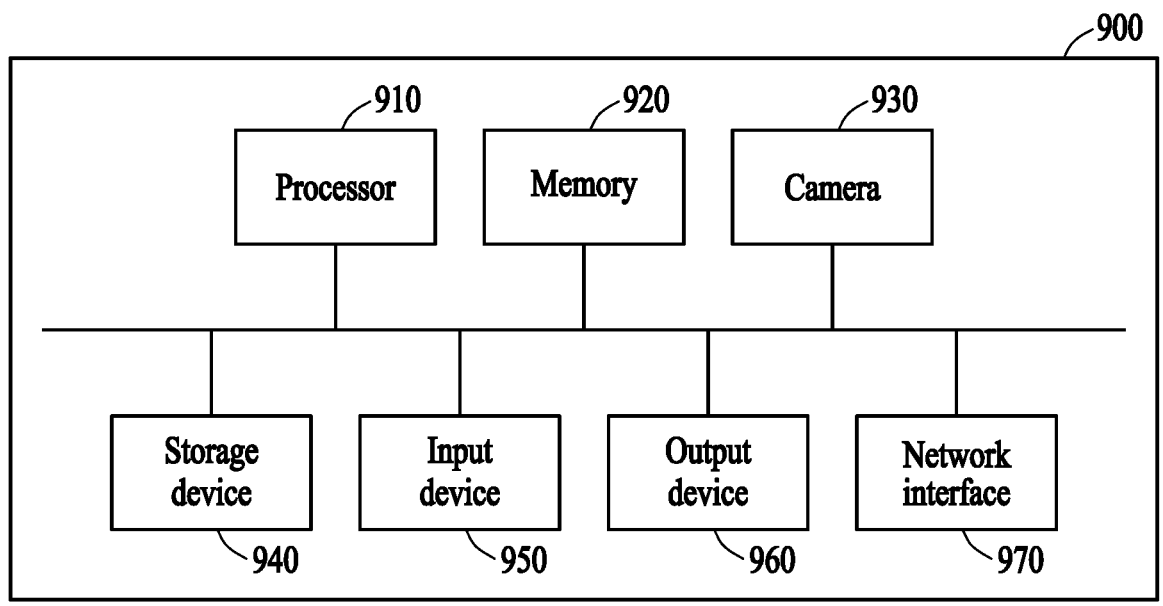
FIG. 9 illustrates an example of a configuration of an electronic apparatus.

FIG. 9 illustrates an example of a configuration of an electronic apparatus. Referring to FIG. 9, an electronic apparatus 900 may include a processor 910, a memory 920, a camera 930, a storage device 940, an input device 950, an output device 960, and a network interface 970. The processor 910, the memory 920, the camera 930, the storage device 940, the input device 950, the output device 960, and the network interface 970 may communicate with each other via a communication bus. For example, the electronic apparatus 900 may be embodied as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, etc.), a home appliance (e.g., a television (TV), a smart TV, a refrigerator, etc.), a security device (e.g., a door lock, etc.), or a vehicle (e.g., an autonomous vehicle, a smart vehicle, etc.). The electronic apparatus 900 may include, structurally and/or functionally, an object tracking apparatus (e.g., the object tracking apparatus 100 of FIG. 1 and the object tracking apparatus 800 of FIG. 8).

The processor 910 may execute instructions and functions in the electronic apparatus 900. For example, the processor 910 may process instructions stored in the memory 920 or the storage device 940. The processor 910 may perform the operations described with reference to FIGS. 1 through 8 and 10. In addition to the description of the processor 910 above, the description of the processor 810 of FIG. 8 is also applicable to processor 910, and are incorporated herein by reference. Thus, the above description may not be repeated here.

The memory 920 may include a non-transitory computer-readable storage medium or a non-transitory computer-readable storage device. The memory 920 may store instructions that are to be executed by the processor 910, and store information associated with software and/or applications when the software and/or applications are being executed by the electronic apparatus 900. In addition to the description of the memory 920 above, the description of the memory 820 of FIG. 8 is also applicable to memory 920, and are incorporated herein by reference. Thus, the above description may not be repeated here.

The camera 930 may capture a photo and/or an image. For example, the camera 930 may generate an input image including a plurality of image frames. In an example, the camera 930 may obtain, for example, a color image, a black and white image, a gray image, an infrared (IR) image, or a depth image. The image frames may include at least a portion of the template image and a search image.

The storage device 940 may include a non-transitory computer-readable storage medium or a non-transitory computer-readable storage device. The storage device 940 may store a greater amount of information than the memory 920 and store the information for a long period of time. For example, the storage device 940 may include magnetic hard disks, optical discs, flash memories, floppy disks, or other forms of non-volatile memories known in the art.

The input device 950 may receive an input from a user through a traditional input scheme using a keyboard and a mouse, and through a new input scheme such as a touch input, a voice input, and an image input. The input device 950 may include, for example, a keyboard, a mouse, a touchscreen, a microphone, or any other device that may detect an input from a user and transfer the detected input to the electronic apparatus 900. The output device 960 may provide a user with output of the electronic apparatus 900 through a visual channel, an auditory channel, or a tactile channel. The output device 960 may include, for example, a display, a touchscreen, a speaker, a vibration generator, or any other device that may provide a user with the output. In an example, the output device 960 may also be configured to receive an input from the user, such as, a voice input, a gesture input, or a touch input. The network interface 970 may communicate with an external device via a wired or wireless network.

In addition, the description provided with reference to FIGS. 1 through 8 and 10 may apply to the electronic apparatus 900.

Figure 10:
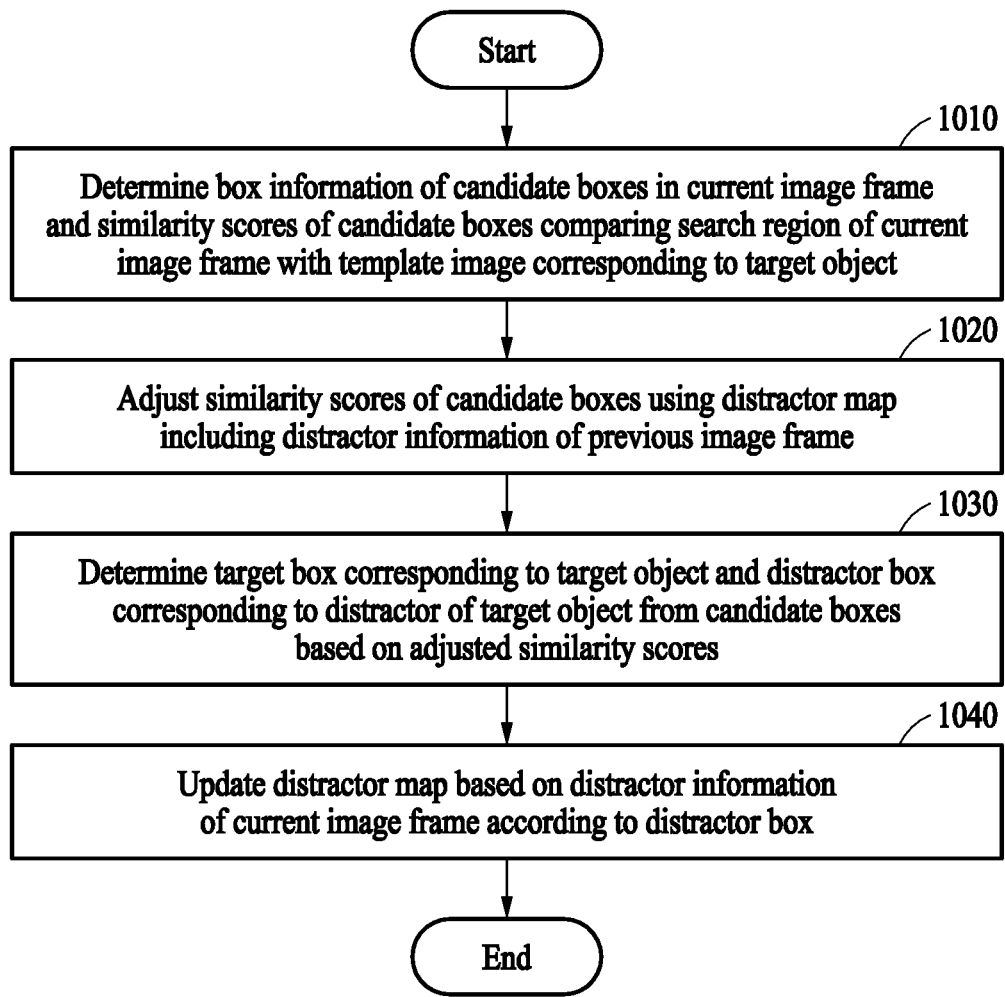
FIG. 10 illustrates an example of an object tracking method.

FIG. 10 illustrates an example of an object tracking method. The operations in FIG. 7 may 10 be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. For example, operations of the method may be performed by a computing apparatus (e.g., the object tracking apparatus 800 in FIG. 8). In addition to the description of FIG. 10 below, the descriptions of FIGS. 1-9 are also applicable to FIG. 10, and are incorporated herein by reference. Thus, the above description may not be repeated here.

Referring to FIG. 10, in operation 1010, an object tracking apparatus may determine box information of candidate boxes in a current image frame and similarity scores of the candidate boxes by comparing a search region of the current image frame with a template image corresponding to a target object. The object tracking apparatus may input the search region and the template image to a neural network-based image comparison model and determine the box information of the candidate boxes and the similarity scores of the candidate boxes from an output of the image comparison model.

In operation 1020, the object tracking apparatus may adjust the similarity scores of the candidate boxes using a distractor map including distractor information of a previous image frame. The object tracking apparatus may determine a mask according to the distractor information of the previous image frame and adjust the similarity scores based on an overlap state between the candidate boxes and the mask. The object tracking apparatus may reduce a similarity score of a candidate box overlapping with the mask at a ratio greater than or equal to a threshold ratio among the candidate boxes. The object tracking apparatus may reduce the similarity scores of the candidate boxes in proportion to an overlap ratio of each of the candidate boxes with the mask.

In operation 1030, the object tracking apparatus may determine a target box corresponding to the target object and a distractor box corresponding to a distractor of the target object from the candidate boxes based on the adjusted similarity scores.

In operation 1040, the object tracking apparatus may update the distractor map based on distractor information of the current image frame according to the distractor box. The object tracking apparatus may update the distractor map by applying motion of distractor to the distractor map. The object tracking apparatus may input the distractor information of the previous image frame and the distractor information of the current image frame to the motion estimation model based on a neural network and estimate motion of a distractor from output of the motion estimation model.

The object tracking apparatus may determine a tracking state of the current image frame based on the box information and the similarity scores and set an object tracking mode to any one of a precise tracking mode for performing object tracking with the distractor map and a normal tracking mode for performing the object tracking without the distractor map based on the tracking state. When the object tracking mode is set to the precise tracking mode, the object tracking may be performed based on adjusting of the similarity scores, determining of the target box and the distractor box, and updating of the distractor map. When the object tracking mode is set to the normal tracking mode, the target box may be determined based on the box information of the candidate boxes and the similarity scores of the candidate boxes without performing the adjusting of the similarity scores, the determining of the target box and the distractor box, and the updating of the distractor map. The object tracking apparatus may set the object tracking mode to the normal tracking mode in at least any one case of non-existence of the distractor of the target object, occlusion of the target object, and detachment of the target object from a frame.

In addition, the description provided with reference to FIGS. 1 through 9 may apply to the object tracking method.

The object tracking apparatus 800 electronic apparatus 900, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the object tracking method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented object tracking method, comprising:
generating box information of candidate boxes in a current image frame;
generating, based on comparing a search region of the current image frame with a template image corresponding to a target object, similarity scores of the candidate boxes where the similarity scores represent an objectness of a target object in the candidate boxes;
adjusting, using a distractor map of a previous image frame comprising distractor information which includes a position of a distractor of the target object in the previous image frame, the similarity scores of the candidate boxes;
determining, based on the adjusted similarity scores, from among the candidate boxes, a target box corresponding to the target object and a distractor box corresponding to the distractor; and
updating the distractor map of the previous image frame to distractor map of the current image frame based on distractor information of the current image frame according to the determined distractor box.

2. The object tracking method of claim 1, wherein the adjusting of the similarity scores comprises:
determining a mask according to the distractor information of the previous image frame;
applying the mask to the search region of the current image frame; and
adjusting the similarity scores based on an overlap between the candidate boxes and the mask.

3. The object tracking method of claim 2, wherein the adjusting of the similarity scores based on the overlap comprises:
reducing a similarity score of a candidate box from among the candidate boxes overlapping with the mask at a ratio greater than or equal to a threshold ratio.

4. The object tracking method of claim 2, wherein the adjusting of the similarity scores based on the overlap state comprises:
reducing the similarity scores of each of the candidate boxes in proportion to an overlap ratio of the respective candidate boxes with the mask.

5. The object tracking method of claim 1, wherein the updating of the distractor map comprises:
applying motion of the distractor to the distractor map.

6. The object tracking method of claim 5, wherein the applying of the motion of the distractor to the distractor map comprises:
inputting the distractor information of the previous image frame and the distractor information of the current image frame to a neural network-based motion estimation model; and
estimating the motion of the distractor from an output of the motion estimation model.

7. The object tracking method of claim 1, wherein the object tracking method further comprises:
determining a tracking state of the current image frame based on the box information and the similarity scores; and
setting an object tracking mode to any one of a precise tracking mode for performing object tracking with the distractor map or a normal tracking mode for performing object tracking without the distractor map based on the tracking state.

8. The object tracking method of claim 7, wherein
object tracking is performed based on the adjusting of the similarity scores, the determining of the target box and the distractor box, and the updating of the distractor map, in response to the object tracking mode being set to the precise tracking mode; and
the target box is determined based on the box information of the candidate boxes and the similarity scores of the candidate boxes without performing the adjusting of the similarity scores, the determining of the target box and the distractor box, and the updating of the distractor map, in response to when the object tracking mode being set to the normal tracking mode.

9. The object tracking method of claim 7, wherein the setting of the object tracking mode comprises:
setting the object tracking mode to the normal tracking mode, in response to any one or any combination of non-existence of the distractor of the target object, occlusion of the target object, and detachment of the target object from a frame.

10. The object tracking method of claim 1, wherein the determining of the box information of the candidate boxes and the similarity scores of the candidate boxes comprises:
inputting the search region and the template image to a neural network-based image comparison model; and
determining the box information of the candidate boxes and the similarity scores of the candidate boxes from an output of the image comparison model.

11. A non-transitory computer-readable storage medium storing instructions that, when executed by a processor, cause the processor to perform the object tracking method of claim 1.

12. An object tracking apparatus, comprising:
a memory configured to store instructions executable by the processor; and
a processor configured to execute the instructions to configure the processor to:
generate box information of candidate boxes in a current image frame;
generate, based on comparing a search region of the current image frame with a template image corresponding to a target object, similarity scores of the candidate boxes where the similarity scores represent an objectness of a target object in the candidate boxes;
adjust, using a distractor map of a previous image frame comprising distractor information which includes a position of a distractor of the target object in the previous image frame, the similarity scores of the candidate boxes;
determine, based on the adjusted similarity scores, from among the candidate boxes, a target box corresponding to the target object and a distractor box corresponding to the distractor; and
update the distractor map of the previous image frame to distractor map of the current image frame based on distractor information of the current image frame according to the determined distractor box.

13. The object tracking apparatus of claim 12, wherein the processor is further configured to:
determine a mask according to the distractor information of the previous image frame;
apply the mask to the search region of the current image frame; and adjust the similarity scores based on an overlap between the candidate boxes and the mask.

14. The object tracking apparatus of claim 12, wherein the processor is further configured to:
    update the distractor map by applying motion of the distractor to the distractor map.

15. The object tracking apparatus of claim 12, wherein the processor is further configured to:
    determine a tracking state of the current image frame based on the box information and the similarity scores; and
    set an object tracking mode to any one of a precise tracking mode for performing object tracking with the distractor map or a normal tracking mode for performing object tracking without the distractor map based on the tracking state.

16. The object tracking apparatus of claim 12, wherein the processor is further configured to:
    input the search region and the template image to an image comparison model based on a neural network; and
    determine the box information of the candidate boxes and the similarity scores of the candidate boxes from an output of the image comparison model.

17. An electronic apparatus, comprising:
    a camera configured to generate an input image comprising image frames, and
    a processor configured to execute the instructions to configure the processor to:
    generate box information of candidate boxes in a current image frame;
    generate, based on comparing a search region of the current image frame among the image frames with a template image corresponding to a target object, similarity scores of the candidate boxes where the similarity scores represent an objectness of a target object in the candidate boxes;
    adjust, using a distractor map of a previous image frame comprising distractor information which includes a position of a distractor in the previous image frame among the image frames, the similarity scores of the candidate boxes;
    determine, based on the adjusted similarity scores, from among the candidate boxes, a target box corresponding to the target object and a distractor box corresponding to the distractor; and
    update the distractor map of the previous image frame to distractor map of the current image frame based on distractor information of the current image frame according to the determined distractor box.

18. The electronic apparatus of claim 17, wherein the processor is further configured to:
    determine a mask according to the distractor information of the previous image frame; and
    adjust the similarity scores based on an overlap state between the candidate boxes and the mask.

19. The electronic apparatus of claim 17, wherein the processor is further configured to:
    update the distractor map by applying motion of the distractor to the distractor map.

20. The electronic apparatus of claim 17, wherein the processor is further configured to:
    determine a tracking state of the current image frame based on the box information and the similarity scores; and
    set an object tracking mode to any one of a precise tracking mode for performing object tracking with the distractor map or a normal tracking mode for performing object tracking without the distractor map based on the tracking state.

21. The electronic apparatus of claim 17, wherein the template image comprises an image frame from among the image frames, and the search region comprises another image frame from among the image frames succeeding the image frame.

22. A processor-implemented object tracking method, comprising:
    determining a template image corresponding to a target object from image frames received from a sensor;
    determining a search region from an image frame of the image frames subsequent to an image frame of the template image;
    extracting a template feature map from the template image and a search feature map from the search region;
    determining box information of candidate boxes and similarity scores of the candidate boxes based on a comparison of the template feature map and the search feature map using a neural network-based image comparison model;
    adjusting the similarity scores of the candidate boxes using a distractor map comprising distractor information of an image frame prior to the image frame of the search region; and
    generating a target box corresponding to the target object and a distractor box corresponding to a distractor of the target object from the candidate boxes based on the adjusted similarity scores.

23. The object tracking method of claim 22, further comprising outputting tracking result of the target object based on box information corresponding to the target box.

24. The object tracking method of claim 22, further comprising updating the distractor map based on box information corresponding to the distractor box.

25. The object tracking method of claim 22, wherein a size of the search region is greater than a size of the template image.

* * * * *